US011620817B2

(12) United States Patent
Petrizio et al.

(10) Patent No.: US 11,620,817 B2
(45) Date of Patent: Apr. 4, 2023

(54) HARDWARE-ACCELERATED OPERATION OF ARTIFICIAL NEURAL NETWORKS

(71) Applicant: Robert Bosch GmbH, Stuttgart (DE)

(72) Inventors: Pia Petrizio, Sindelfingen (DE); Rolf Michael Koehler, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 331 days.

(21) Appl. No.: 17/103,705

(22) Filed: Nov. 24, 2020

(65) Prior Publication Data

US 2021/0174108 A1 Jun. 10, 2021

(30) Foreign Application Priority Data

Dec. 5, 2019 (DE) .......................... 102019218947.4

(51) Int. Cl.
*G06K 9/00* (2022.01)
*G06V 10/94* (2022.01)
(Continued)

(52) U.S. Cl.
CPC .............. *G06V 10/95* (2022.01); *G06K 9/628* (2013.01); *G06K 9/6265* (2013.01); *G06K 9/6277* (2013.01); *G06N 3/04* (2013.01); *G06V 20/58* (2022.01); *G06V 20/582* (2022.01); *G06V 20/588* (2022.01); *G06V 20/698* (2022.01)

(58) Field of Classification Search
CPC ...... G06V 10/95; G06V 20/58; G06V 20/582; G06V 20/588; G06V 20/698; G06K 9/6265; G06K 9/6277; G06K 9/628; G06K 9/6271; G06N 3/04; G06N 3/0454; G06N 3/0481; G06N 3/063; G06N 3/082
See application file for complete search history.

(56) References Cited

U.S. PATENT DOCUMENTS

2019/0205649 A1* 7/2019 Ananthanarayanan ......................
G06K 9/6218
2020/0143160 A1* 5/2020 Liu .................. G06V 10/82

FOREIGN PATENT DOCUMENTS

CN 110222718 A * 9/2019 ............... G06K 9/00
EP 0689154 A2 * 12/1995 ............... G06K 9/34

OTHER PUBLICATIONS

Ipek Baz, "Context-aware confidence sets for Fine grained product recognition" (Year: 2019).*

* cited by examiner

*Primary Examiner* — Dhaval V Patel
(74) *Attorney, Agent, or Firm* — Norton Rose Fulbright US LLP; Gerard Messina

(57) ABSTRACT

A method for operating an artificial neural network (ANN) on a hardware platform. The ANN is designed to ascertain confidences with which input data are to be assigned to N discrete classes. The hardware platform includes a dedicated unit which forms from a list of M>N confidences expanded confidences by encoding into each confidence an identification number of its place in the list, and numerically sorts the expanded confidences. The unit is fed confidences 1, ..., M−N, which have the minimal representable value, and confidences M−N+1, ..., M, which correspond to the N discrete classes, and/or it is ensured that those confidences fed to the unit that correspond to one of the N discrete classes have a value higher than the minimal representable value. A ranking of the classes ordered according to confidences, to which the input data are to be assigned, is ascertained from the first N of the numerically sorted expanded confidences.

14 Claims, 4 Drawing Sheets

(51) Int. Cl.
*G06K 9/62* (2022.01)
*G06N 3/04* (2023.01)
*G06V 20/58* (2022.01)
*G06V 20/56* (2022.01)
*G06V 20/69* (2022.01)

HARDWARE-ACCELERATED OPERATION OF ARTIFICIAL NEURAL NETWORKS

CROSS REFERENCE

The present application claims the benefit under 35 U.S.C. § 119 of German Patent Application No. DE 102019218947.4 filed on Dec. 5, 2019, which is expressly incorporated herein by reference in its entirety.

FIELD

The present invention relates to the operation of artificial neural networks on hardware platforms, which include a dedicated unit for evaluating the results provided by the network.

BACKGROUND INFORMATION

Artificial neural networks (ANN) are frequently used to classify physical measured data into discrete classes that are relevant for the respective application. For example, physical measured data that have been obtained by observing the surroundings of a vehicle are classified in terms of which types of objects are suggested by these measured data.

For example, the ANN may output a confidence for each of the discrete classes, with which the input data are to be assigned to this class. The confidences may then be standardized using the softmax function in such a way that they are in the interval [0,1] and result in a sum of 1.

The softmax function requires the calculation of an exponential function. It is difficult to accelerate this calculation via specialized, but nevertheless cost-efficient, hardware. In contrast, hardware platforms for an accelerated operation of ANN are commercially available, which indicate solely in a descending order of confidence a ranking of the classes, to which the input data according to the statement of the ANN belong. The unit for evaluating this ranking, in particular, is designed for a fixed number of discrete classes.

SUMMARY

Within the scope of the present invention, a method has been developed for operating an artificial neural network, ANN, on a hardware platform. In accordance with an example embodiment of the present invention, the ANN is designed to ascertain confidences with which input data N are to be assigned to discrete classes. These confidences are, in general, numerical values, which are to be considered as a measure for the probability that the assignment of an input dataset (for example, an image recorded from a vehicle) to the respective class (for example, "image includes this or that traffic sign") within the context of the respective application (for example, the at least semi-automated control of a vehicle in road traffic) is correct. The confidences are not yet necessarily standardized to a value range between 0 and 1 and also do not have to result in a sum of 1. This would be the task of the softmax function. Within the scope of the method, however, it is a question of indicating preferably quickly a ranking of the classes to which the input data according to the statement of the ANN belongs.

For this purpose, a hardware platform including the above-mentioned dedicated unit is used, which is designed to form expanded confidences in each case from a list of the confidences ascertained by the ANN, by encoding in each confidence an identification number of its place in the list. The expanded confidences are then numerically sorted in order on this basis to arrive at the ranking of the classes ordered according to the confidences, to which the input classes are to be assigned.

Thus, if there are N=4 discrete classes 1, 2, 3, and 4, for example, to which the input data including confidences of 0, 5, 2, and 10 are to be assigned, it is then possible, for example, to encode the identification number of the respective place in the list into the third position after the decimal point. The expanded confidences are then 0.001, 5.002, 2.003, and 10.004. The numerical sorting in descending order results in 10.004, 5.002, 2.003, 0.001. This means that the correct sorting of the classes is 4, 2, 3, 1.

Due to the implementation in hardware, the dedicated unit is designed for the purpose of carrying out this type of processing with a fixed number M. This means that the dedicated unit expects a list of exactly M confidences. If M is now greater than the number N of the available discrete classes, the list is filled at the end with the minimum representable value. Let this minimally representable value in the above-cited example be zero. If the dedicated unit now expects M=6 confidences, but there are only N=4 classes, then the unit processes a list including confidences 0, 5, 2, 10, 0, and 0 to form expanded confidences 0.001, 5.002, 2.003, 10.004, 0.005, and 0.006. The numerical sorting now results in 10.004, 5.002, 2.003, 0.006, 0.005, 0.001 and thus provides a sorting 4, 2, 3, 6. This is incorrect in the context of the application in which there are only four classes.

The method then provides two options usable individually or also in combination for stopping exactly this behavior in cases in which the dedicated unit expects more confidences than there are discrete classes.

The first option is to feed to the dedicated unit confidences 1, . . . , M−N, which have the minimal representable value, as well as confidences M−N+1, . . . , M, which correspond to the N discrete classes. The first-mentioned confidences, which are in the list only because there is still space there, in addition to the N confidences supplied by the ANN, are thus assigned the spaces having the lowest identification numbers. The associated expanded confidences into which these identification numbers are encoded are thus at the very bottom in the result of the numerical sorting. If, however, only N values are read out from this result, the result is the correctly sought ranking of the classes. It is only necessary to subtract M−N, respectively, from the identification numbers of the spaces encoded in the expanded confidences in order to arrive at the N identification numbers of the classes.

In the above-cited example, a list including M=6 confidences 0, 0, 0, 5, 2, and 10 becomes via the unit with this conversion a list including the expanded confidences 0.001, 0.002, 0.003, 5.004, 2.005, and 10.006. The numerical sorting results in 10.006, 5.004, 2.005, 0.003, 0.002, 0.001. Of these only the first N=4 values continue to be used. Of the identification numbers 6, 4, 5, and 3 encoded into these values, N−M=2 are subtracted in each case, so that the final result obtained is the correct sorting 4, 2, 3, 1 of the classes.

The second option is to ensure that those confidences fed to the dedicated unit that correspond to one of the N discrete classes have a value higher than the minimal representable value. Thus, the minimal representable value is then reserved exclusively for the "pseudo confidences," with which the list of N entries is filled by the M entries expected by the dedicated unit. In this way as well, it is ensured that after the numerical sorting of the expanded confidences, the N values corresponding to the used discrete classes are first in the list. In contrast to the first option, once the expanded confidences are numerically sorted, the need to convert the identification numbers of the spaces encoded therein by subtracting M−N is eliminated.

Let, for example, the processing of the ANN in the above-cited example be configured to produce only confidence values, which are at least 0.01. The ANN therefore then provides confidences 0.01, 5, 2, and 10, and this list is supplemented by two "pseudo-confidences" having the minimal representable value 0. Accordingly, the expanded confidences are 0.011, 5.022, 2.003, 10,004, 0.005, and 0.006. The numerical sorting of this list results in 10.004, 5.002, 2.003, 0.011, 0.006, and 0.005. Of these, again only the first N=4 entries are used, and the correct sorting of the classes 4, 2, 3, 1 again results from the space numbers encoded herein.

Regardless of which of the two options is selected, the effect is therefore the same: the numerical sorting of the expanded confidences moves the N values that correspond to the classes used by the ANN to the top of the obtained list, whereas the M−N values resulting from the filling of the list fed to the dedicated unit from N to M values follow behind. Because the ranking of the classes is now ascertained from the first N values of the numerically sorted list of expanded confidences, this ranking includes only classes that are also actually used by the ANN.

This in turn means that the further technical application, which makes use of the ascertained ranking, is fed only valid identification numbers of classes. Functional failures, which could result from the processing of invalid identification numbers, are avoided.

Such failures may have consequences that are unpredictable and may be difficult to reproduce, so that the problem would be difficult to confine if it were not eliminated at its source.

Thus, for example, it is common programming practice in most types of software to store pieces of information, which are to be transferred from one routine for further processing to the next routine, in a particular area in the working memory and to transfer to the next routine a pointer to this area. In a control software, for example, which operates with the results provided by the ANN, pointers to memory areas at which the pieces of information next to be processed are stored may accordingly be calculated from identification numbers of classes. The occurrence of invalid identification numbers in the ranking (i.e., 5 or 6 in the above-cited example) may then result in reading out from areas in the working memory that are completely different from those provided, those pieces of information that just happen to be there. These pieces of information have in all probability nothing to do with the task presently to be executed, so that the further processing achieves meaningless results, which also change with each program execution. In this state, the control software is not useful for activating technical systems.

What exactly the "minimal representable value" is in the context of the above statements is a function of the type of data specifically used for representing the confidences. In the above-cited illustrative example, in which only non-negative numbers occur, the minimally representable value is 0. In the technical application, fixed-point numbers are frequently used, which are represented by a particular number of bits, the numerical value resulting from the bits due to a predefined specification. For example, a fixed number of bits may be used in order to represent the pre-decimal (i.e., the integer-) part and the remaining bits may be used in order to represent the post-decimal (i.e., the fraction-) part and, if necessary, the sign. The establishment of the position of the decimal point is variable and may be adapted to the numerical values.

Another representation would be floating-point numbers, which are represented by a particular number of bits, the numerical value resulting from the bits being due to a predefined specification. For example, a first portion of the bits may establish the mantissa, i.e., the digits of the number, and a second portion of the bits may establish the exponent to an established basis, i.e., for example, 2 or 10. A further bit may optionally also represent the sign. The minimally representable value may then, for example, be the value that results according to the predefined specification if all bits are 0.

In one particularly advantageous embodiment of the present invention, the dedicated unit is designed to encode into the lowest value bits of a binary representation of each confidence in the list the identification number of the place of this confidence in the list. In this way, it is ensured that the values of the confidences, when further processed to form expanded confidences, are changed only to the minimally possible extent regardless of their specific order of magnitude. Thus, the values are still sufficiently exact in order to be directly used in the respective technical application if more is demanded in this application than only the mere ranking of the classes.

In one further particularly advantageous embodiment of the present invention, at least one processing layer of the ANN is adapted to the effect that it outputs confidences 1, . . . , M−N, which have the minimal representable value, as well as confidences M−N+1, . . . , M, which correspond to the N discrete classes. In this way, the list of confidences may be transferred directly from the ANN to the dedicated unit for sorting. If, for example, the arithmetic unit, with which the function of the last processing layer of the ANN is performed, is seated on the same chip as the unit dedicated for sorting, then the confidences must not leave this chip before they are transferred to the dedicated unit. The transfer of data within a chip is generally significantly faster than the transfer to another chip.

At least one processing layer of the ANN may, for example, be a convolution layer, which applies filters characterized by filter parameters to the input of this processing layer. Thus, for example, a "convolutional neural network" includes a plurality of such convolution layers. The adaptation of the processing layer includes setting filter parameters, which characterize filters effecting confidences 1, . . . , M−N, to zero. Filter parameters that effect confidences M−N+1 may, in particular, then correspond to those filter parameters that effected the confidences 1, . . . , N before the adaptation. In this way, the output of the processing layer of N confidences may be adapted to M confidences and, at the same time, be resorted in such a way that those confidences, with which the list transferred to the dedicated unit is merely filled, are at the top of this list. For this purpose, the confidences must not leave an arithmetic unit, with which the function of this processing layer is implemented.

The adaptation of the processing layer may further particularly advantageously include setting an output, obtained after applying filters including filter parameters set to zero, to the minimal representable value by applying a constant offset. Offsets to the remaining filters may then remain unchanged. Thus, the offsets may be expanded, for example, corresponding to the expansion of the provided confidences from N to M confidences, by being set to the minimally representable value for the first M−N confidences. The offsets to confidences M−N+1, . . . , M may correspond to those offsets that belonged to confidences 1, ..., N before the adaptation. In this way, it is ensured that those confidences that have been used merely for filling from N to M confidences have the minimal representable value and thus end up at the bottom places of the list when the expanded confidences are numerically sorted.

The adaptation of the processing layer may further include, for example, setting parts of its input, on which confidences 1, ..., M–N depend, to the minimal representable value. Even this change is possible without having to depart from the arithmetic unit, which carries out the function of the processing layer. Thus, for example, in a "convolutional neural network," which transfers "feature maps" from one convolutional layer to the next, such a transfer may be preceded by an additional "pseudo-feature map, in which all values correspond to the minimal representable value.

In one further particularly advantageous embodiment of the present invention, at least one processing layer of the ANN is adapted to the effect that with regard to the N discrete classes, it outputs only confidences that are higher than the minimal representable value. As explained above, those confidences that are used solely for filling the list from N to M confidences automatically end up in the bottom places in the numerical sorting of the expanded confidences.

In the process, the dimensionality of the output of the processing layer remains the same. In this regard, the intervention into the ANN is less serious than the expansion to an additional provision of "pseudo-confidences."

In order to adapt the processing layer of the ANN in this way, activation functions of neurons or other processing units may, for example, be adapted, in particular, in such a way that they output only values higher than the minimal representable value. Thus, for example, at least one activation function in the processing layer may be replaced by a rectifying function. One example of such a function is the Rectified Linear Unit (ReLU). An adaptation of the activation function may, for example, take place, in particular, already at the point in time of the training, so that inaccuracies or artifacts that are potentially caused by this adaptation, may be largely compensated for by the training.

In one further particularly advantageous embodiment of the present invention, a hardware platform is selected, which includes, in addition to the dedicated unit, at least one arithmetic unit situated with the unit in a shared integrated circuit for performing the function of at least one processing layer of the ANN. Such hardware platforms are commercially available. As explained above, the modification of the processing in the context of the above-described method in many specific embodiments may be integrated into at least one processing layer in such a way that the confidences do not have to leave the shared integrated circuit before the transfer to the dedicated unit. In this way, the speed advantage resulting from the integration of the arithmetic unit with the dedicated unit remains fully intact. The improvement to the effect that the ultimately ascertained ranking of the classes includes no invalid identification numbers for classes, costs therefore only very little additional computing time.

In one particularly advantageous embodiment of the present invention, physical measured data, which have been detected using the at least one sensor, are input into the ANN during the operation of the ANN. The discrete classes then represent the evaluation products relevant for the respective technical application obtained from these physical measured data. The discrete classes may represent, in particular, traffic signs, other road users, roadway boundaries and/or other objects, whose presence may necessitate an adaptation of the behavior of a vehicle carrying the sensor, and/or different semantic meanings of the measured data with respect to a processing of speech recorded using the sensor and/or different levels of quality of serially manufactured products, which are subjected to a quality control with the aid of the sensor, and/or different sources of noises, and/or different types of objects, whose emergence in an area monitored with the aid of the sensor may represent a safety-relevant event for this area, and/or qualitatively different states of a biological sample studied with the aid of the sensor.

In this context, the method ensures in each case that all confidences each relate only to classes that are also defined for the respective arrangement. It is only for such classes that the technical system activated in each case on the basis of the ascertained ranking knows an appropriate response. Moreover, as explained above, the appearance of non-defined identification numbers of classes may result in serious malfunctions already at the deep level of the program execution on a computer.

The present invention further relates to a method, which includes the complete event chain up to the activation of the technical system. In accordance with an example embodiment of the present invention, in this method, a trained ANN is initially provided. The ANN is operated using the above-described method. For this purpose, the ANN maps physical measured data that have been detected using at least one sensor, onto confidences, with which it assigns these measured data to N discrete classes. A ranking of the classes ordered according to confidences is also ascertained. The confidences and/or the ranking are processed to form at least one activation signal. A vehicle, and/or a speech recognition system, and/or a system for the quality control of serially manufactured products and/or a system for monitoring an area, and/or a system for medical imaging is/are activated using the activation signal.

Because invalid identification numbers for classes no longer appear, it is ensured according to that described above that even in operating situations in which particular classes are assigned very low confidences, the respective technical system always executes a response appropriate to the respective operating situation and not some unpredictable response.

The methods may be, in particular, completely or partially computer-implemented. The present invention therefore also relates to a computer program including machine-readable instructions which, when they are executed on one or on multiple computers, prompt the computer or computers to carry out one of the described methods. In this context, control units for vehicles and embedded systems for technical devices, which are also capable of executing machine-readable instructions, are also to be considered computers.

The present invention also relates to a machine-readable data medium and/or to a download product including the computer program. A download product is a digital product transmittable via a data network, i.e., downloadable by a user of the data network, which may be offered for sale, for example, in an online shop for immediate download.

In addition, a computer may be furnished with the computer program, with the machine-readable data medium or with the download product.

BRIEF DESCRIPTION OF THE DRAWINGS

Further measures improving the present invention are described in greater detail below, together with the description of the preferred exemplary embodiments of the present invention with reference to the figures.

DETAILED DESCRIPTION OF EXAMPLE EMBODIMENTS

Figure 1:
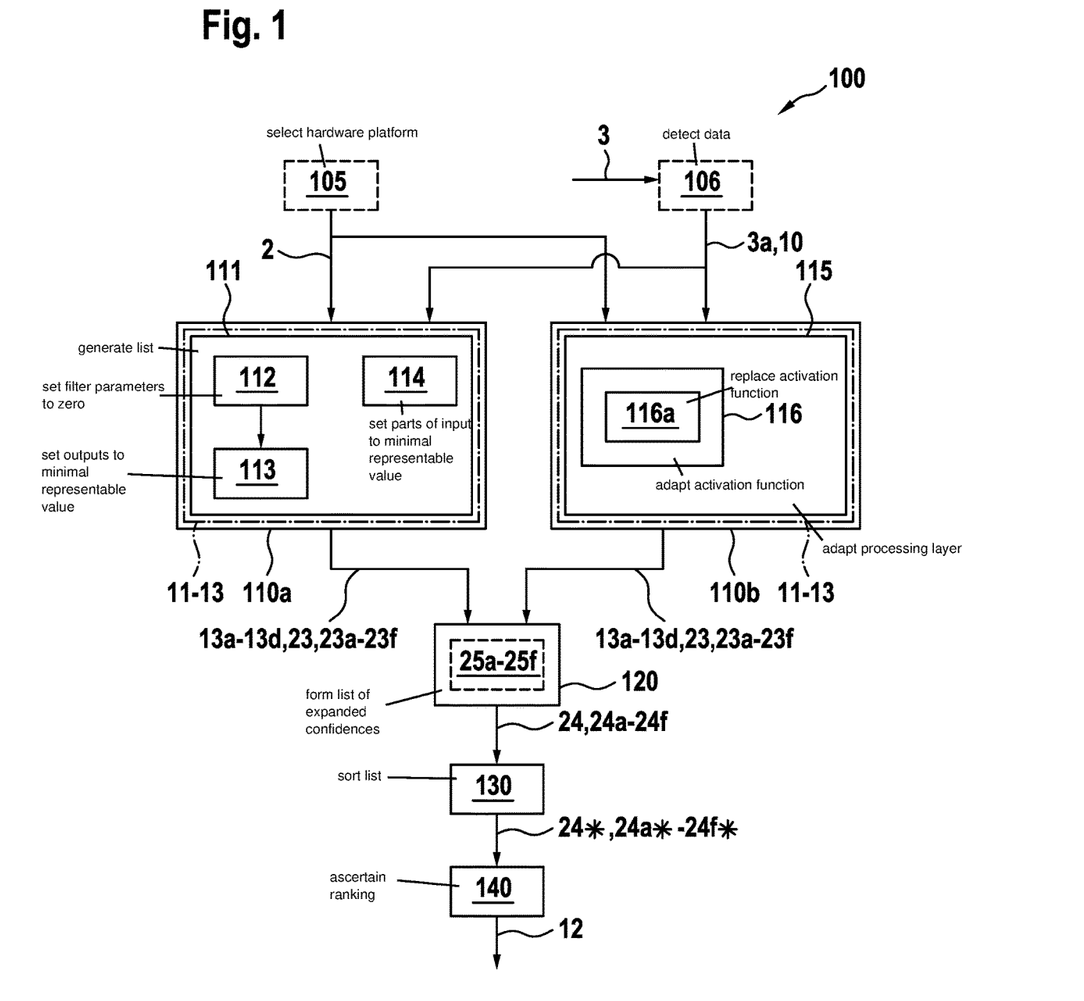
FIG. 1 shows one exemplary embodiment of method 100 for operating ANN 1, in accordance with the present invention.

FIG. 1 is a flowchart of one exemplary embodiment of method 100 for operating ANN 1. In optional step 105, a hardware platform 2 is selected, which combines an arithmetic unit 21 for performing the function of at least one processing layer 11 through 13 of ANN 1, as well as a dedicated unit 22 in an integrated circuit 20. Dedicated unit 22 is designed to recode and sort confidences 13a through 13d, with which input data 10 input into ANN 1 are to be assigned to available discrete classes 12a through 12d, in such a way that sought ranking 12 of the confidences may be easily ascertained as a result. The interaction of ANN 1 with unit 22 for this purpose is described in greater detail below. According to optional step 106, data 10 may, in particular, be physical measured data 3a, which have been detected using at least one sensor 3.

ANN 1 is originally designed to ascertain from input data 10 N confidences 13a through 13d, with which these data 10 are each to be assigned to available discrete classes 12a through 12d. Dedicated unit 22 expects, however, a list 23 of M>N confidences 23a through 23f. Two different ways are shown in FIG. 1 as to how confidences 13a through 13d may be transferred into list 23 in such a way that ultimately obtained ranking 12 does not refer to any invalid classes (i.e., not contained in the canon of available classes 12a through 12d).

According to step 110a, list 23 begins with M−N confidences 23a, 23b, which have the minimal representable value μ. List 23 is continued with confidences 23c through 23f, which correspond to confidences 13a through 13d, and thus to classes 12a through 12d. Here, it is possible that among confidences 13a through 13d, there are those that have minimal representable value μ.

According to step 110b, it is ensured that confidences 13a through 13d, 23c through 23f, which correspond to one of the N discrete classes 12a through 12d, have a value higher than minimal representable value μ. Here, list 23 may be filled at an arbitrary position by M values with N-M pseudo-confidences 23a, 23b, which have minimal representable value μ.

In step 120, a list 24 of expanded confidences 24a through 24f is formed by dedicated unit 22, regardless of in which way list 23 has been generated. Encoded into each confidence 23a through 23f for this purpose is an identification number 25a through 25f of its place in list 23. In step 130, this list 23 is numerically sorted to form a list 24* of sorted expanded confidences 24a* through 24f*. The ranking 12 sought is ascertained from first N elements of this sorted list 24* in step 140.

As explained above, both step 110a as well as step 110b each ensure that during the numerical sorting in step 130, "pseudo confidences" 23a, 23b, which do not correspond to one of available classes 12a through 12d, are "shipped" to the end of sorted list 24*, and are thus no longer included in first N elements of this list 24* evaluated in step 140.

Within box 110a it is shown, for example, how according to block 111 list 23 may be generated directly in ANN 1 in the manner described by a modification of the processing in processing layers 11 through 13 of ANN 1. According to block 112, filter parameters, which affect "pseudo-confidences" 23a, 23b, may be set to zero. According to block 113, outputs that have been generated by convolution layers based on filter parameters set to zero, may be set to minimal representable value μ by applying a constant offset. Alternatively or also in combination herewith, parts of the input of processing layers 11 through 13, on which "pseudo-confidences" 23a, 23b depend, may according to block 114 be set by "pseudo-feature maps" to minimal representable value μ.

Within box 110b, it is shown, for example, how according to block 115 at least one processing layer 11 through 13 of ANN 1 may be adapted in such a way that with respect to the N discrete classes 12a through 12d, it outputs exclusively confidences 13a through 13d, which are higher than the minimal representable value μ. According to block 116, this may take place, in particular, for example, by adapting the activation function of neurons or of other processing units. According to sub-block 116a, for example, an activation function may, in particular, be replaced for this purpose by a rectifying function such as, for example, the ReLU function.

Figure 2:
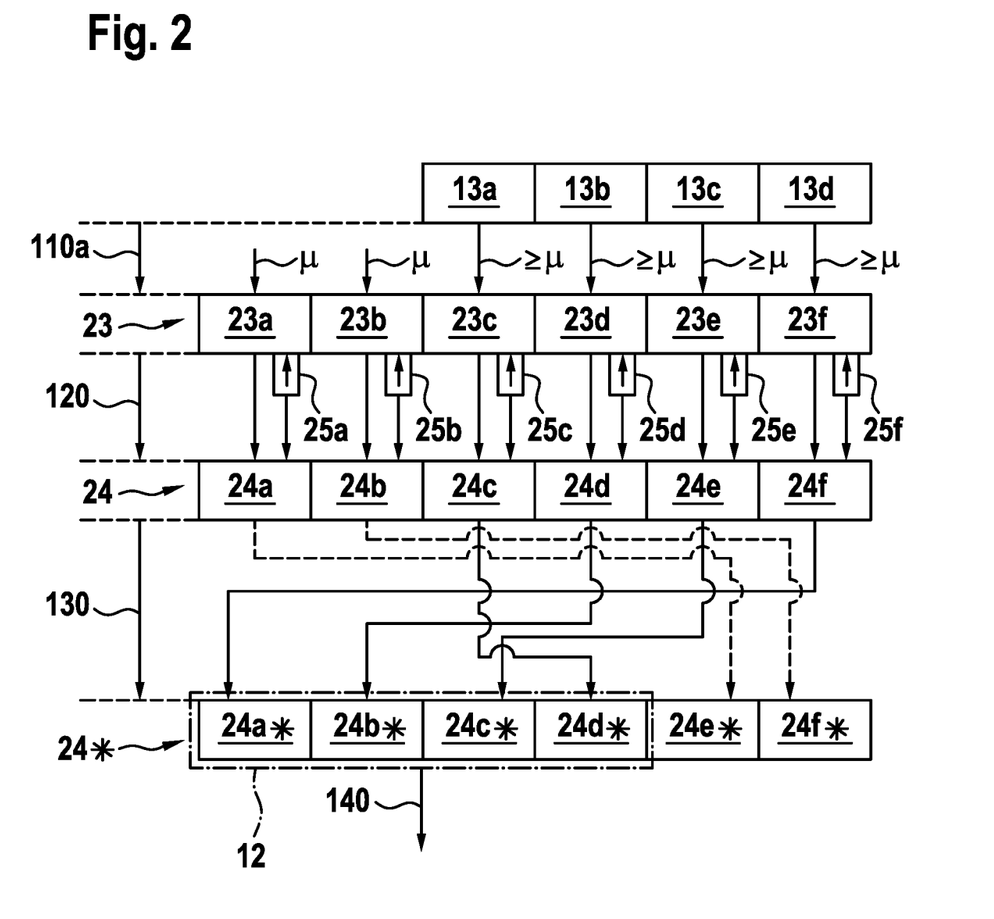
FIG. 2 shows an illustration of the effect of step 110a in the context of method 100, in accordance with an example embodiment of the present invention.

FIG. 2 illustrates how step 110a operates in the context of method 100. List 23 created in step 110a initially includes two "pseudo-confidences" 23a, 23b with minimal representable value μ and is then continued with confidences 13a through 13d, which are identified with 23c through 23f in the context of list 23.

Each ("pseudo" or real) confidence 23a through 23f in list 23 has an identification number 24a through 25f, which designates its place in list 23. Expanded confidences 24a through 24f in list 24 are formed in step 120 from confidences 23a through 23f in connection with these identification numbers 25a through 25f.

Since "pseudo confidences" 23a, 23b are at the top of list 23, identification numbers 25a, 25b of their places in list 23 have the lowest values. During the numerical sorting of list 24 in step 130, this combination of lowest possible confidences 23a, 23b in connection with lowest possible identification numbers 25a, 25b, results in corresponding expanded confidences 24a, 24b becoming last elements 24e*, 24f* of sorted list 24*. This also applies when other confidences 13a through 13d, 23c through 23f also have smallest possible value μ.

Accordingly, first N elements 24a* through 24d* of list 24* are the sorting result of expanded confidences 24c through 24f, which relates only to valid classes 12a through 12d. According to step 140, this sorting result may be used as ranking 12 ordered according to confidences 13a through 13d. Identification numbers 25a through 25d included in elements 24a* through 24d* must still be reduced by the number of "pseudo-confidences" 23a, 23b, in this case 2, and correspond then to the numbers of classes 12a through 12d, to which confidences 13a through 13d, 23c through 23f relate.

Figure 3:
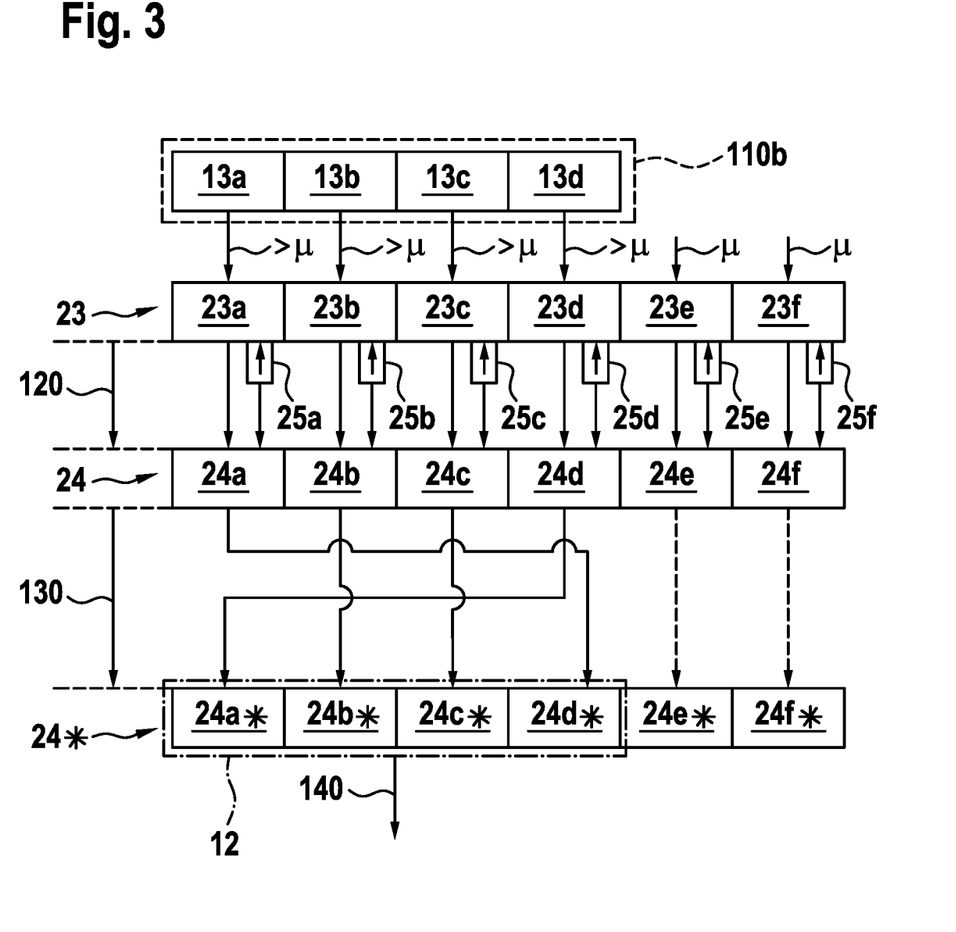
FIG. 3 shows an illustration of the effect of step 110b in the context of method 100, in accordance with an example embodiment of the present invention.

By comparison, FIG. 3 illustrates how step 110b operates in the same context. Here, all "real" confidences 13a through 13d receive values here that are greater than minimal representable value μ. "Pseudo-confidences" 23e, 23f, which are drawn here at the bottom of list 23, but may also sit at an arbitrary other position in list 23, are therefore "doomed" from the outset to end up at the bottom of sorted list 24* during the numerical sorting in step 130. Therefore, the same effect occurs as outlined in FIG. 2, namely, that first N elements 24a* through 24d* of sorted list 24* include desired ranking 12. Identification numbers 25a through 25d included in these elements 24a* through 24d* correspond directly to the numbers of classes 12a through 12d, to which confidences 13a through 13d, 23a through 23d relate.

Figure 4:
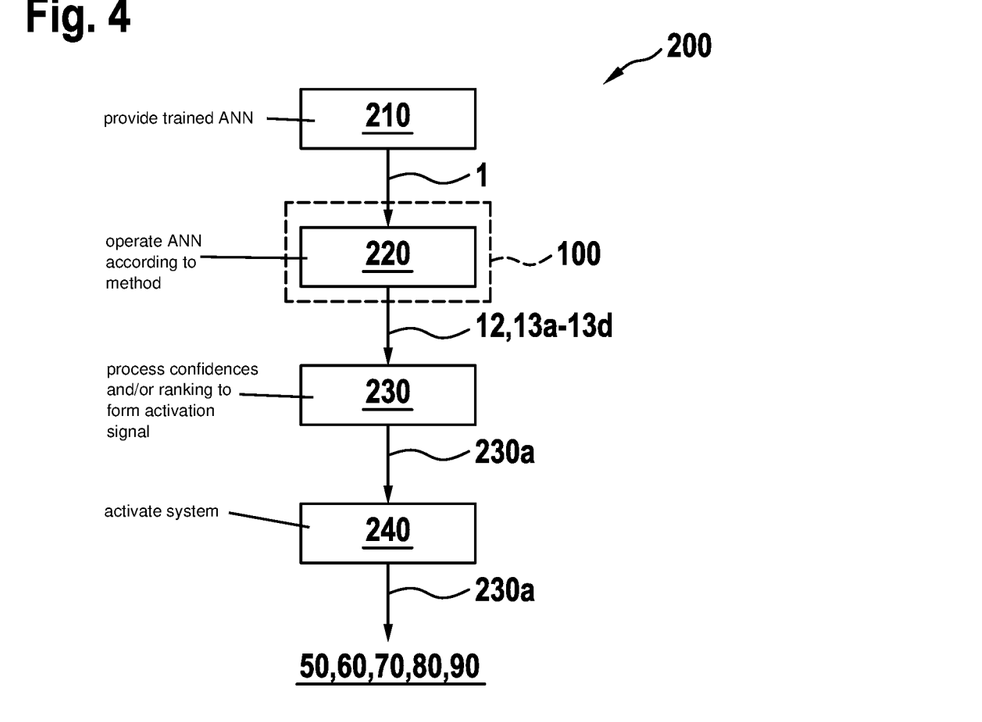
FIG. 4 shows one exemplary embodiment of method 200 including a complete event chain, in accordance with the present invention.

FIG. 4 shows one exemplary embodiment of method 200 including the complete event chain up to the activation of technical systems. In step 210, a trained ANN 1 is provided. In step 220, ANN 1 is operated according to method 100. Confidences 13a through 13d as well as a ranking 12 of classes 12a through 12d ordered according to these confidences 13a through 13d are obtained in the process.

In step 230, confidences 13a through 13d and/or ranking 12 are processed to form at least one activation signal 230a. In step 240, a vehicle 50, a speech recognition system 60, a system 70 for the quality control of serially manufactured products, and/or a system 80 for monitoring an area, and/or a system 90 for medical imaging, is/are activated using activation signal 230a.

Figure 5:
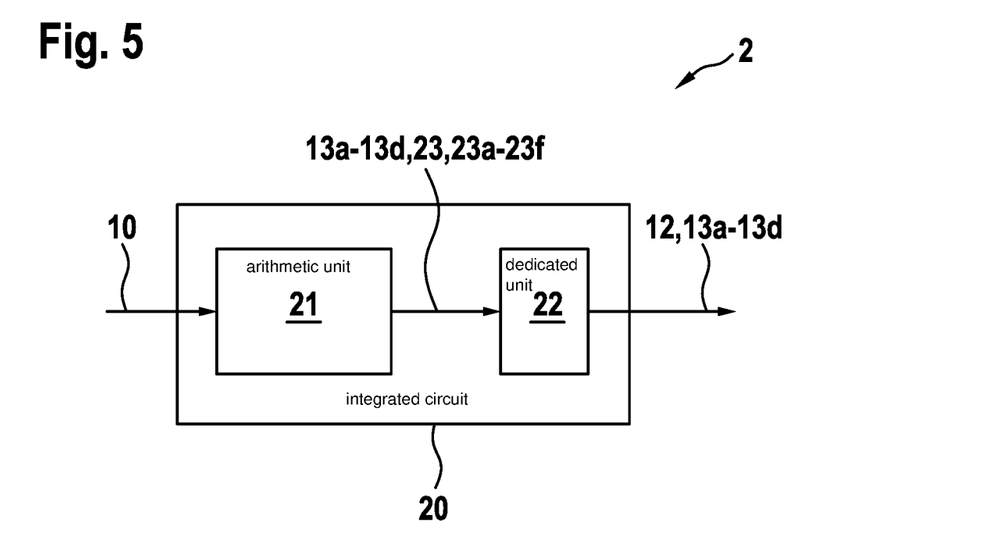
FIG. 5 shows an implementation including a hardware platform 2, arithmetic unit 21 and dedicated unit 22 combined in an integrated circuit 20, in accordance with an example embodiment of the present invention.

FIG. 5 illustrates the implementation of method 100 with the help of a hardware platform 2, which combines in an integrated circuit 20 an arithmetic unit 21 for performing the function of at least one processing layer 11 through 13 of ANN 1, as well as dedicated unit 22 for recoding 120 and sorting 130.

Data 10 input into ANN 1 are processed by arithmetic unit 21. If the generation of list 23 is able to be implemented in the described manner by adapting processing layers 11 through 13 of ANN 1, then list 23 including all M confidences 23a through 23f may be generated within integrated circuit 20 and may be transferred at the highest bandwidth to dedicated unit 22.

The speed at which hardware-accelerated dedicated unit 22 manages recoding 120 and sorting 130, may therefore be fully exploited in order to obtain preferably quickly ranking 12 ordered according to confidences 13a through 13d.

What is claimed is:

1. A method for operating an artificial neural network (ANN), on a hardware platform, the ANN being configured to ascertain confidences with which input data are to be assigned to N discrete classes, and the hardware platform including a dedicated unit, the method comprising the following steps:
    forming, by the dedicated unit, from a list of M>N confidences, expanded confidences by encoding into each of the M confidences an identification number of its place in the list;
    numerically sorting the expanded confidences by the dedicated unit;
    (i) feeding to the dedicated unit confidences 1, . . . , M−N, which have a minimal representable value, and as confidences M−N+1, . . . , M, which correspond to the N discrete classes; and/or (ii) ensuring those confidences fed to the dedicated unit that correspond to one of the N discrete classes have a value higher than the minimal representable value; and
    ascertaining a ranking of the classes ordered according to confidences to which the input data are to be assigned from a first N of the numerically sorted expanded confidences.

2. The method as recited in claim 1, wherein the dedicated unit is configured to encode into the lowest value bits of a binary representation of each of the M confidences in the list the identification number of the place of the confidence in the list.

3. The method as recited in claim 1, wherein at least one processing layer of the ANN is adapted to output the confidences 1, . . . , M−N, which have the minimal representable value, and the confidences M−N+1, . . . , M which correspond to the N discrete classes.

4. The method as recited in claim 3, wherein the at least one processing layer of the ANN is a convolution layer, which applies filters characterized by filter parameters to the input of the processing layer, and the adaptation of the processing layer includes setting filter parameters, which characterize filters affecting the confidences 1, . . . , M−N, to zero.

5. The method as recited in claim 4, wherein the adaptation of the processing layer further includes setting an output obtained after applying the filters including the filter parameters set to zero to the minimal representable value by applying a constant offset.

6. The method as recited in claim 3, wherein the adaptation of the processing layer includes setting parts of its input, on which the confidences 1, . . . , M−N depend, to the minimal representable value.

7. The method as recited in claim 1, wherein at least one processing layer of the ANN is adapted to the effect that, with respect to the N discrete classes, the processing layer outputs exclusively confidences that are higher than the minimal representable value.

8. The method as recited in claim 7, wherein the adaptation of the processing layer includes adapting activation functions of neurons or of other processing units in such a way that the activation functions output only values higher than the minimal representable value.

9. The method as recited in claim 8, wherein at least one activation function in the processing layer is replaced by a rectifying function.

10. The method as recited in claim 1, wherein a hardware platform is selected which, in addition to the dedicated unit, includes at least one arithmetic unit situated together with the dedicated unit in a shared integrated circuit for performing the function of at least one processing layer of the ANN.

11. The method as recited in claim 1, wherein physical measured data that have been detected using at least one sensor are input into the ANN and the discrete classes represent:
    traffic signs, and/or other road users, and/or roadway boundaries and/or other objects, whose presence may necessitate an adaptation of a behavior of a vehicle carrying the sensor; and/or
    different semantic meanings of the measured data with respect to a processing of speech recorded using the sensor; and/or
    different levels of quality of serially manufactured products, which are subjected to a quality control with using the sensor; and/or different sources of noises, and/or different types of objects, whose emergence in an area monitored using the sensor may represent a safety-relevant event for the area; and/or qualitatively different states of a biological sample examined using the sensor.

12. A method, comprising the following steps:

providing a trained artificial neural network (ANN);

operating the ANN on a hardware platform to map physical measured data that have been detected using at least one sensor onto confidences, with which it assigns the measured data to N discrete classes, the hardware platform including a dedicated unit, the operating including:

forming, by the dedicated unit, from a list of M>N confidences, expanded confidences by encoding into each of the M confidences an identification number of its place in the list, numerically sorting the expanded confidences by the dedicated unit, (i) feeding to the dedicated unit confidences 1, ..., M−N, which have a minimal representable value, and as confidences M−N+1, ..., M, which correspond to the N discrete classes; and/or (ii) ensuring those confidences fed to the dedicated unit that correspond to one of the N discrete classes have a value higher than the minimal representable value; and ascertaining a ranking of the classes ordered according to confidences to which the physical measured data are to be assigned from a first N of the numerically sorted expanded confidences;

assigning to the physical measured data the confidences from the first N of the numerically sorted expanded confidences;

processing the confidences assigned to the physical measured data and/or the ranking to form at least one activation signal; and activating, using the activation signal, a vehicle, and/or a speech recognition system, and/or a system for quality control of serially manufactured products, and/or a system for monitoring an area, and/or a system for medical imaging.

13. A non-transitory machine-readable data medium on which is stored a computer program for operating an artificial neural network (ANN), on a hardware platform, the ANN being configured to ascertain confidences with which input data are to be assigned to N discrete classes, and the hardware platform including a dedicated unit, the computer program, when executed by one or more computers, cause the one or more computers to perform the following steps:

forming, using the dedicated unit, from a list of M>N confidences, expanded confidences by encoding into each of the M confidences an identification number of its place in the list;

numerically sorting the expanded confidences using the dedicated unit;

(i) feeding to the dedicated unit confidences 1, ..., M−N, which have a minimal representable value, and as confidences M−N+1, ..., M, which correspond to the N discrete classes; and/or (ii) ensuring those confidences fed to the dedicated unit that correspond to one of the N discrete classes have a value higher than the minimal representable value; and ascertaining a ranking of the classes ordered according to confidences to which the input data are to be assigned from a first N of the numerically sorted expanded confidences.

14. A computer configured to operating an artificial neural network (ANN), on a hardware platform, the ANN being configured to ascertain confidences with which input data are to be assigned to N discrete classes, and the hardware platform including a dedicated unit, the computer configured to:

forming, using the dedicated unit, from a list of M>N confidences, expanded confidences by encoding into each of the M confidences an identification number of its place in the list;

numerically sorting the expanded confidences using the dedicated unit;

(i) feeding to the dedicated unit confidences 1, ..., M−N, which have a minimal representable value, and as confidences M−N+1, ..., M, which correspond to the N discrete classes; and/or (ii) ensuring those confidences fed to the dedicated unit that correspond to one of the N discrete classes have a value higher than the minimal representable value; and ascertaining a ranking of the classes ordered according to confidences to which the input data are to be assigned from a first N of the numerically sorted expanded confidences.

* * * * *